(12) United States Patent
Ornaghi et al.

(10) Patent No.: US 9,054,918 B2
(45) Date of Patent: Jun. 9, 2015

(54) METHOD AND DEVICE FOR NETWORK TRAFFIC MANIPULATION

(75) Inventors: Alberto Ornaghi, Treviglio (IT); Marco Valleri, Lecce (IT); Daniele Milan, Robecchetto Con Induno (IT); Valeriano Bedeschi, Milan (IT)

(73) Assignee: HT S.R.L. (IT)

( * ) Notice: Subject to any disclaimer, the term of this patent is extended or adjusted under 35 U.S.C. 154(b) by 307 days.

(21) Appl. No.: 13/813,496

(22) PCT Filed: Aug. 3, 2010

(86) PCT No.: PCT/IT2010/000352
§ 371 (c)(1),
(2), (4) Date: Jan. 31, 2013

(87) PCT Pub. No.: WO2012/017457
PCT Pub. Date: Feb. 9, 2012

(65) Prior Publication Data
US 2013/0132571 A1 May 23, 2013

(51) Int. Cl.
*G06F 15/173* (2006.01)
*H04L 29/08* (2006.01)
*H04L 29/12* (2006.01)
*G06F 15/16* (2006.01)

(52) U.S. Cl.
CPC .... *H04L 29/08099* (2013.01); *H04L 29/12066* (2013.01); *H04L 61/1511* (2013.01); *H04L 67/2804* (2013.01); *H04L 67/025* (2013.01); *H04L 67/2814* (2013.01); *H04L 67/02* (2013.01)

(58) Field of Classification Search
CPC ............ H04L 63/1466; H04L 67/2814; H04L 63/306; G06F 67/02; G06F 6/2814

USPC .............................. 709/218, 224, 245; 726/26
See application file for complete search history.

(56) References Cited

U.S. PATENT DOCUMENTS

| 6,687,732 | B1 | 2/2004 | Bector et al. | |
|---|---|---|---|---|
| 8,200,752 | B2 * | 6/2012 | Choudhary et al. | 709/203 |
| 2002/0178381 | A1 * | 11/2002 | Lee et al. | 713/201 |
| 2006/0031404 | A1 * | 2/2006 | Kassab | 709/218 |
| 2008/0201413 | A1 * | 8/2008 | Sullivan et al. | 709/203 |
| 2013/0311677 | A1 * | 11/2013 | Coulson et al. | 709/245 |

OTHER PUBLICATIONS

International Search Report for corresponding international application No. PCT/IT2010/000352 filed on Aug. 3, 2010; Mail date May 2, 2011.
Written Opinion for corresponding international application No. PCT/IT2010/000352 filed on Aug. 3, 2010; Mail date May 2, 2011.
Reply to Written Opinion for corresponding international application No. PCT/IT2010/000352 filed on Aug. 3, 2010; Dec. 5, 2011.

* cited by examiner

*Primary Examiner* — Wen-Tai Lin
(74) *Attorney, Agent, or Firm* — Cantor Colburn LLP

(57) ABSTRACT

A device for manipulating data traffic related to a target connected to a data communications network whose elements communicate by means of an HTTP protocol comprises: a redirection device, which is adapted to be connected to the data communications network by means of a plurality of sniffing interfaces and a packet sending interface; a proxy, which is adapted to be connected to the data communications network by means of an HTTP connection interface, a packet receiving interface and a packet injection interface; and is characterized in that the redirection device is configured to monitor, by means of the sniffing interfaces, the network traffic in order to identify within the network traffic at least one data packet associated with the target and to redirect, by means of the packet sending interface, the at least one data packet associated with the target toward the proxy.

8 Claims, 2 Drawing Sheets

METHOD AND DEVICE FOR NETWORK TRAFFIC MANIPULATION

TECHNICAL FIELD

The present invention relates to a method and a device for monitoring and manipulating network traffic and, in particular, for installing applications on remote terminals.

BACKGROUND ART

In many situations it can be useful to be able to install applications on networked remote terminals, or to modify applications being downloaded and installed from a network, even transparently to the users of such terminals. Consider, for example, the installation of control devices, capable of performing monitoring and notification of the operations performed at the terminal, in particular in the context of lawful interception activities or the insertion of customized advertising content in applications downloaded by the user.

For this purpose, devices are known which allow to modify network traffic on-the-fly: these devices are based on code injection techniques. These techniques allow to intercept and modify data packets in transit on the network during download on the part of the user who uses the terminal onto which one wishes to install the application, generally referenced as the target terminal.

In general, devices that perform code injection are probes that operate in in-line mode: in other words, the traffic passes physically within a probe, entering through a network port and exiting from another port. One side communicates with the terminal, or client, and the other side communicates with the server to which the user is connected. When the traffic passes through the probe, the probe can modify its content, adding the data required for the installation of the desired application.

However, the devices known in the art are not free from drawbacks: in particular, the need to place the equipment physically in the middle of the communication is a requirement that limits their use. In some cases it is in fact impossible to interrupt a cable to place a probe in order to make network traffic pass within it. In other cases this operation, although possible, requires designing a very complex architecture, especially if the probe has to be inserted in the network of an Internet Service Provider: in this case it is in fact necessary to ensure the reliability and redundancy of the probe in case of fault, since it is not desirable for a fault on the probe to cause interruption of network service for the target.

With reference to the Internet, another drawback arises from the fact that, in general, the point where these probes are located is the uplink of a provider, i.e., the point through which all the connections of a given DSLAM toward the Internet pass. These links group the connections of hundreds of users, and accordingly the used bandwidth is very large. Accordingly, an in-line probe positioned in this point must have such characteristics as to ensure a very high performance, in order to ensure that all traffic passes unhindered within it without degrading performance. Indeed, because of the performance that must be ensured, not so much for the modified connections as for all the other connections that are not strictly subjected to modifications, the cost of these apparatuses is very high.

SUMMARY OF THE INVENTION

The aim of the present invention is to devise a method and a device for manipulating network traffic that is capable of overcoming the limitations of the background art described above.

Within this aim, an object of the invention is to provide a device and a method for monitoring network traffic and for injecting code in network traffic without requiring said traffic to pass physically within the device.

Another object of the invention is to provide a device and a method that can operate selectively only on the connections to be modified.

Another object of the invention is to provide the code injection operations for specific targets effectively, efficiently and transparently for said targets.

Another object of the invention is to provide a device that is highly reliable, relatively easy to provide and at competitive costs.

This aim, as well as these and other objects that will become better apparent hereinafter, are achieved by a method for manipulating the data traffic related to a target connected to a data communications network whose elements communicate according to the HTTP protocol, comprising the steps that consist in:

passively intercepting, on the part of a traffic manipulation device which comprises a proxy, a first HTTP request that originates from said target, said first HTTP request comprising a first domain associated with a server and a requested resource; sending, on the part of the manipulation device, a first HTTP response related to said first HTTP request, said first HTTP response comprising redirection instructions, which in turn comprise a second domain; passively intercepting, on the part of the traffic manipulation device, a DNS query toward a DNS server that originates from the target, the DNS query comprising a query to resolve the second domain with an IP address; sending, on the part of the manipulation device, a DNS response related to the DNS query, the DNS response comprising the resolution of the second domain with the IP address of the proxy; receiving, on the part of the proxy, a second HTTP request that originates from the target, the second HTTP request comprising the second domain and the requested resource; sending, on the part of the proxy, a third HTTP request toward the server, the third HTTP request comprising the first domain and the requested resource; receiving, on the part of the proxy, a second HTTP response originating from the server and related to the third HTTP request, the second HTTP response comprising the requested resource; modifying, on the part of the proxy, the requested resource; sending, on the part of the proxy, a third HTTP response to the target, the third HTTP response comprising the modified resource.

Advantageously, the second domain sent in the first HTTP request reply is a fictitious subdomain of the first domain.

The intended aim and objects are also achieved by a device for manipulating data traffic related to a target connected to a data communications network whose elements communicate by means of the HTTP protocol, comprising: a redirection device, which is adapted to be connected to the data communications network by means of a plurality of sniffing interfaces and a packet sending interface; a proxy, which is adapted to be connected to the data communications network by means of an HTTP connection interface, a packet receiving interface and a packet injection interface; the redirection device being configured to monitor, by means of said sniffing interfaces, network traffic in order to identify within the network traffic at least one data packet associated with the target and to redirect, by means of the packet sending interface, said at least one data packet associated with the target toward the proxy, the proxy being in turn configured to send, by means of the HTTP connection interface, an HTTP request toward elements of the data communications network, the HTTP request being based on the content of the data packet associated with the target, and to send, by means of the packet injection interface, data to the target which are based on the data received in response to the HTTP request.

BRIEF DESCRIPTION OF DRAWINGS

Further characteristics and advantages of the invention will become better apparent from the description of a preferred but not exclusive embodiment of the method and the system according to the invention, illustrated by way of non-limiting example in the accompanying drawings, wherein.

WAYS OF CARRYING OUT THE INVENTION

Figure 1:
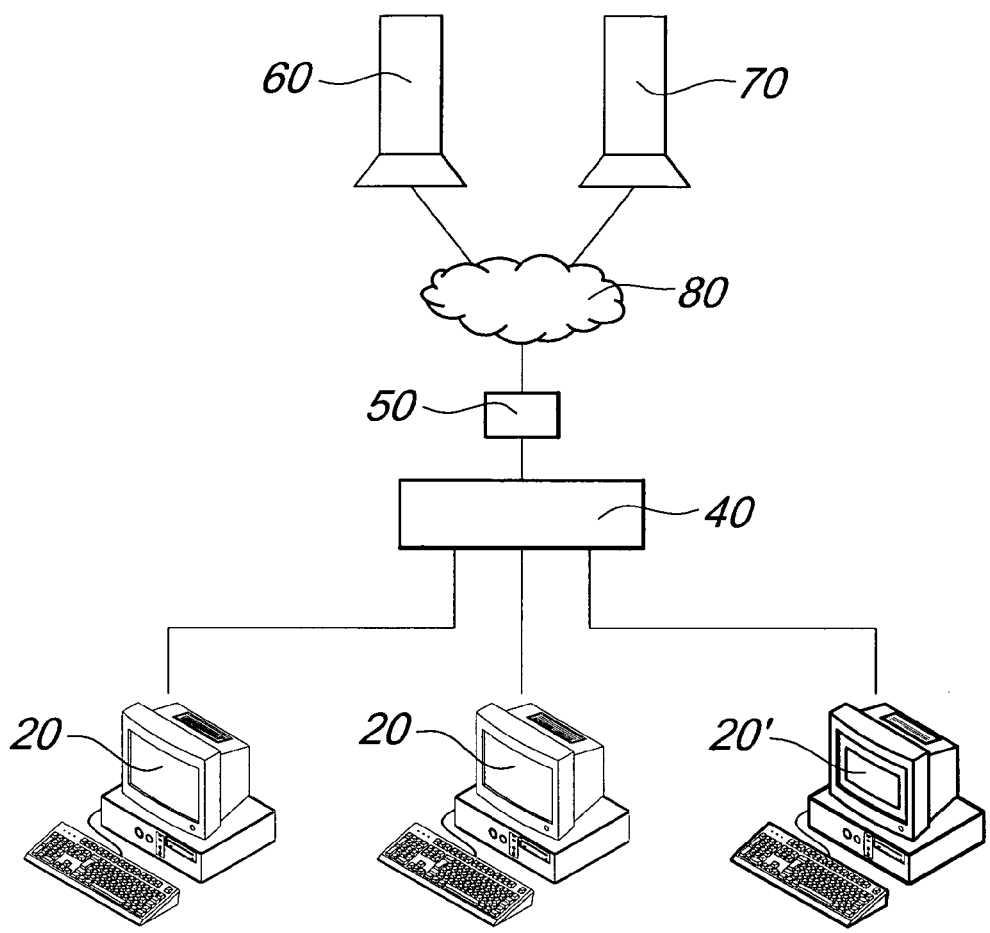
FIG. 1 is a block diagram of an exemplary embodiment of the interface between the traffic manipulation device according to the invention and the Internet.

FIG. 1 is a schematic view of a portion of the Internet and of a possible placement of the traffic manipulation device according to the invention in the layout diagram.

The figure comprises a plurality of clients 20, among which a particular client, termed target 20', an access switch 40, the device according to the invention 50, a generic server 60 and a DNS server 70 are shown.

The client 20 (or the target 20') is any device configured to access the Internet, for example a personal computer or a smartphone. In a preferred embodiment, the clients 20 access the network by means of an Internet service provider (ISP).

The provider has one or more access switches 40, i.e., known network devices which group the uplink connections of a plurality of users and are capable of selectively forwarding in downlink the packets received toward the appropriate output port. The access switch 40 in general manages a large quantity of connections and therefore high data traffic.

In normal conditions, the access switch 40 is connected to the Internet 80, to which a server 60 and a DNS server 70 are also connected by way of example.

The server 60, in a preferred embodiment, is a known type of web server, i.e., a computer capable of serving requests from clients sent by means of the HTTP protocol; requests can comprise files of any type, from web pages to executable files.

The DNS server 70 is a server of the known type which is adapted to resolve domain names into IP addresses and vice versa.

Finally, the traffic manipulation device according to the invention or selective probe 50 is a device placed between the access switch 40 and the Internet. In a preferred embodiment, the traffic manipulation device 50 according to the invention is located proximate to the access switch 40 related to the target 20' whose traffic one wishes to manipulate, for reasons that will become better apparent hereinafter. The traffic manipulation device 50 according to the invention comprises a functionality of the passive probe type, i.e., a probe that is capable of monitoring network traffic without said traffic passing physically through the device, as will be described now in greater detail with reference to FIG. 2.

Figure 2:
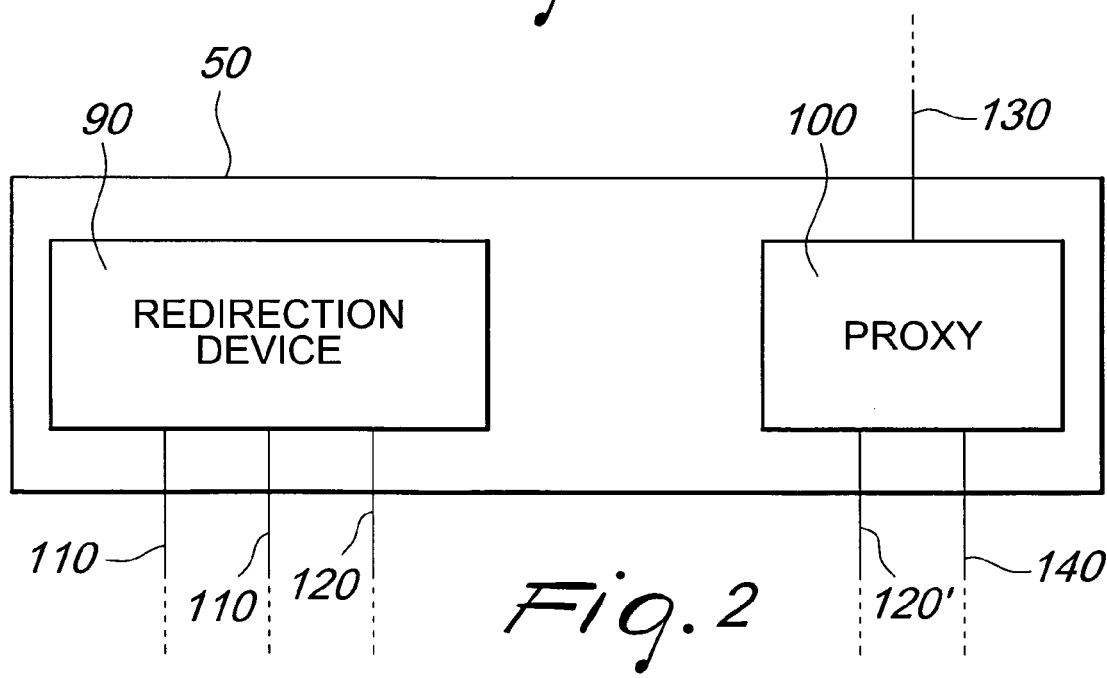
FIG. 2 is a block diagram of an exemplary architecture of the traffic manipulation device according to the invention.

FIG. 2 is a block diagram that illustrates a possible embodiment of the traffic manipulation device 50 according to the invention of FIG. 1.

The traffic manipulation device 50 according to the invention comprises two main components: a redirection device 90 and a proxy 100.

The redirection device 90 is a network device which comprises one or more network interfaces, known as sniffing interfaces 110, which monitor the uplink traffic that originates from the access switch 40; these interfaces use sniffing techniques, i.e., techniques for passive interception and decoding of the data packets in transit. The redirection device 90 further comprises an additional network interface, the packet sending interface 120, by means of which the redirection device 90 sends to the proxy 100 an adapted selection of the monitored packets, according to criteria that will be described in greater detail hereinafter.

The proxy 100 is a network device which comprises a packet receiving interface 120', by means of which the proxy 100 receives the packets rerouted by the redirection device 90. The proxy 100 further comprises an HTTP connection interface 130, by means of which HTTP communication occurs between the proxy 100 and the remote servers, for example with the server 60 and with the DNS server 70. Finally, the proxy 100 comprises a packet injection interface 140, by means of which the modified data packets are sent to the target 20'. In a preferred embodiment, the packet receiving interface 120' and the packet injection interface 140 coincide.

It should be noted that the redirection device 90 and the proxy 100 are not connected one another; in a preferred embodiment, they are installed on the same machine, but in alternative embodiments they might be positioned in different points of the network.

Operation of the device is as follows: the redirection device 90, by means of the sniffing interfaces 100, monitors the traffic, identifies the packets that originate from the target 20' and identifies the HTTP connection to be modified. Once the individual HTTP connection to be modified has been identified, the redirection device 90 diverts said connection toward the proxy 100 by means of the packet sending interface 120. In this manner, the target 20' connects to the proxy 100, which connects to the server, indicated in the HTTP connection, from which the data are to be downloaded.

While the data are being downloaded, the proxy 100 modifies said data in a streamline and on-the-fly mode and sends them to the target 20' by means of the packet injection interface 140. The result, from the point of view of the target 20', as regards the download request forwarded to the network, is thus the same that would occur if the file had been downloaded directly from the server from which the data originate.

A possible embodiment of a method adapted to implement the operation described above is now described in greater detail with reference to FIG. 3.

Figure 3:
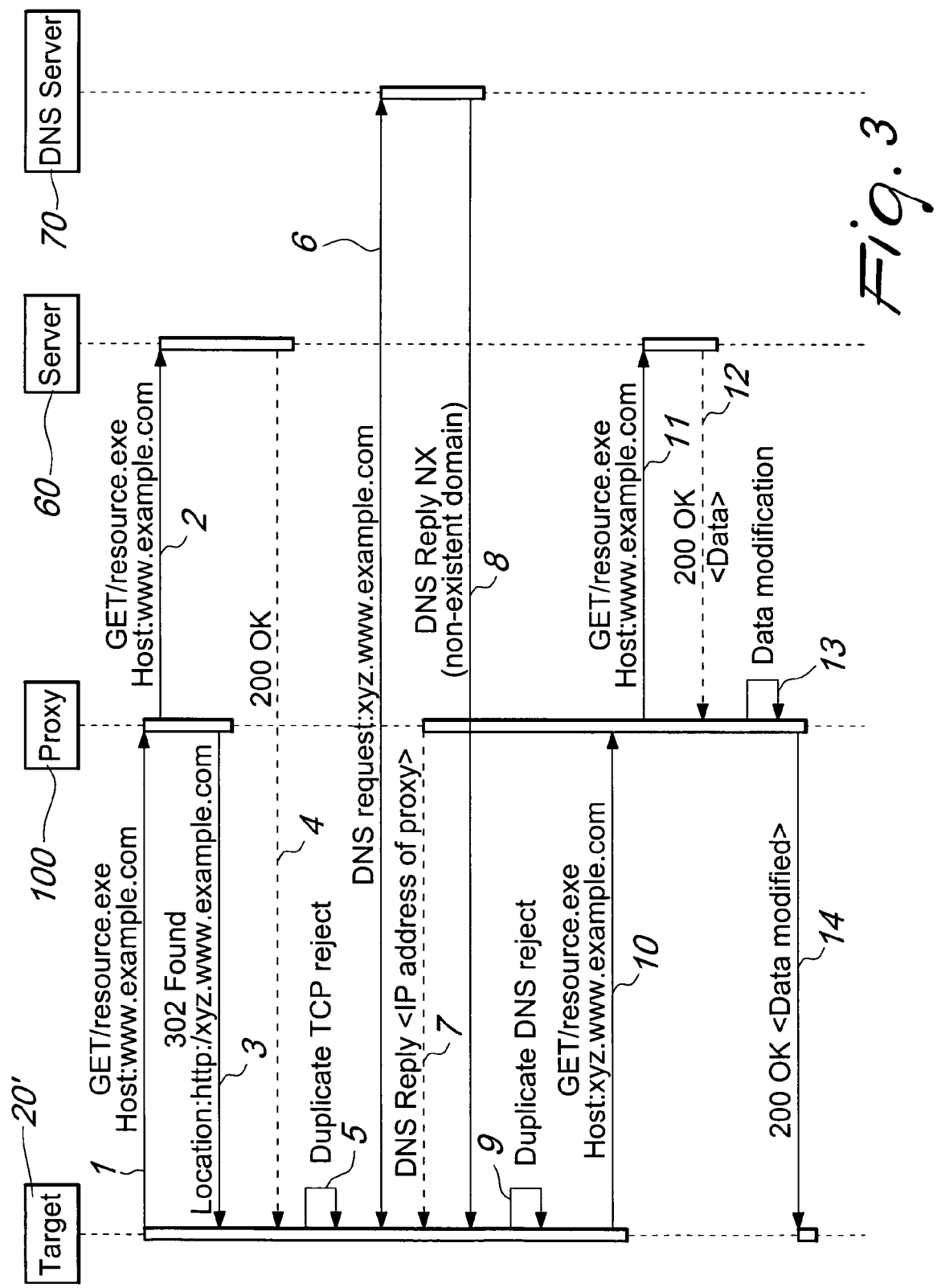
FIG. 3 is a flowchart of an exemplary embodiment of the method for manipulating network traffic according to the invention.

FIG. 3 illustrates the steps of the communication between the target 20', the proxy 100, the server 60 and the DNS server 70 described in FIGS. 1 and 2.

The method begins in step 1, in which the target 20' sends to the server 60 an HTTP request; by way of example, said request can be a request of the GET type for a resource termed "resource.exe", hosted on a site that has the domain name www.example.com, i.e., the domain name of the server 60. As described earlier, this request is identified, with known sniffing or passive interception techniques, by the redirection device 90. In the sniffing step, the SEQ and ACK numbers of the TCP protocol related to the connection in progress are detected and stored; in step 2, the HTTP request reaches the remote server 60; in step 3, the proxy 100 sends to the target 20' an HTTP response related to the sent request, which is thus received by the target 20' as if it had been sent by the server 60.

This step can be performed by adopting techniques for spoofing the source address which are known in the art, which use the SEQ and ACK numbers of the TCP protocol obtained in step 1. The HTTP response sent by the proxy 100 is a redirection of the address sent in the request, typically obtained by returning the status code "302 Found"; moreover, the redirection is performed toward a non-existent host, which is preferably characterized in that it appears as a subdomain of the one sent in the request. For example, the subdomain might be of the type "xyz.www.example.com". In this manner, the target 20' will be convinced that the resource has been shifted to a subdomain of the main server, as is common practice, and will consider the source to be trusted. It is further important that "xyz" is not a valid subdomain, for reasons that will be clarified in step 6. This domain is inserted, as is known, in the "location" header of the HTTP response. In step 4, the server 60 responds independently to the request sent by the target 20' in step 1, typically with an HTTP response that contains the status code "200 OK". However, since the target 20' has already accepted a response to the request of step 1 in the TCP stream (i.e., the response sent by the proxy 100 in step 3), in step 5 the response of the server 60 is rejected as duplicate.

It should be noted that the method provides for step 3 to be performed necessarily before step 4, i.e., for the response sent by the proxy 100 to reach the target 20' before the response sent by the server 60, so that the latter, not the response of the proxy 100, is rejected by the target 20' as duplicate. As is known to the person skilled in the art, this situation generally is not deterministic, in the sense that these are two independent and concurrent activities, and therefore the response of the server 60 might arrive before the response of the proxy 100. However, since, as shown with reference to FIG. 1, the device 50 according to the invention is located as close as possible to the target 20', this ensures that the round-trip time of the packets toward the remote server 60 is longer than the round-trip time from the target 20' to the device 50; in other words, for an appropriate placement of the device 50 according to the invention, it is ensured that the proxy 100 always wins the so-called race condition on remote servers.

The method then continues in step 6, in which the target 20' sends a DNS query to the DNS server 70 to resolve the (non-existent) host name received in step 3. For the method according to the invention to be successful, this step must actually entail a query to the DNS server 70 and not for example a resolution of the domain name with locally-found information. For this reason, it is necessary, as indicated in step 3, for the subdomain received by the target 20' in step 3 to be not valid: if the subdomain to which the target 20' is redirected were valid, it might already be in the cache of the target 20' for prefetch DNS mechanisms implemented in latest-generation browsers.

The DNS query sent in step 6 also is sniffed by the device 50 according to the invention in a manner similar to what has occurred in step 1, and, by virtue of this, in step 7 the proxy 100 sends to the target 20' a DNS response to the DNS query of step 6, which is characterized in that it contains the association between the non-existent domain and the IP address of the proxy 100.

In step 8, the DNS server 70 sends the DNS response related to the query of step 6, typically a response that indicates that the domain is non-existent "("NX non existent domain"). However, as occurred in step 5, in this case also in step 9 the response is rejected because a response for the same query has already been received in step 7. In this situation also, as already seen as regards steps 3 and 4, correct operation of the method provides for step 7 to be performed necessarily before step 8, i.e., the proxy 100 must always win the race condition on the DNS server 70, and in this case also this is ensured by the placement of the device 50 according to the invention.

In step 10, the target 20' performs the same HTTP request as in step 1, but using the IP address received in step 7, i.e., the IP address of the proxy 100; the proxy 100 then performs a legitimate HTTP request toward the original server 60, for example the request of the "resource.exe" resource of step 1.

In response to this request, in step 12 the server 60 sends the requested data to the proxy 100; as the data are downloaded, in steps 13 and 14, the proxy 100 thus modifies said data and sends the modified data to the target 20'. At the end of the method, the target 20' will have thus downloaded a resource, named "resource.exe", that it will consider to be the one requested in step 1 but has instead been modified by the proxy 100.

As is known, by means of an appropriate modification of the resource it is also possible to ensure that its execution causes the installation of a software which is not correlated thereto silently and transparently.

In practice it has been found that the method and the device according to the invention fully achieve the intended aim. In particular, it has been found that the device and the method thus conceived allow to overcome the quality limitations of the background art, since the network traffic does not pass physically within the device.

Moreover, the method according to the invention is conceived so as to divert only the connections that actually have to be modified, and so that it does not have to send again the received packets; thanks to these characteristics, the performance required to ensure that the traffic flow does not degrade is lower than required in the background art, with an advantageous impact on costs.

Finally a particularly complex fault redundancy architecture is not required, since a fault in the device according to the invention would entail only the failure to monitor the targets, without any impact on network infrastructure.

The system thus conceived is susceptible of numerous modifications and variations, all of which are within the scope of the inventive concept; all the details may further be replaced with other technically equivalent elements.

Therefore, the scope of the protection of the claims must not be limited by the illustrations or preferred embodiments shown in the description by way of example, but rather the claims must comprise all the characteristics of patentable novelty that reside in the present invention, including all the characteristics that would be treated as equivalents by the person skilled in the art.

Where technical features mentioned in any claim are followed by reference signs, those reference signs have been included for the sole purpose of increasing the intelligibility of the claims and accordingly such reference signs do not have any limiting effect on the interpretation of each element identified by way of example by such reference signs.

The invention claimed is:

1. A method for manipulating data traffic related to a target connected to a data communications network whose elements communicate according to an HTTP protocol, comprising the steps of:
   passively intercepting, on the part of a traffic manipulation device which comprises a proxy, a first HTTP request that originates from said target, said first HTTP request comprising a first domain associated with a server and a requested resource;
   sending, on the part of said manipulation device, a first HTTP response related to said first HTTP request, said first HTTP response comprising redirection instructions, said redirection instructions in turn comprising a second domain;

passively intercepting, on the part of said traffic manipulation device, a DNS query toward a DNS server that originates from said target, said DNS query comprising a query to resolve said second domain with an IP address;

sending, on the part of said manipulation device, a DNS response related to said DNS query, said DNS response comprising the resolution of said second domain with the IP address of said proxy;

receiving, on the part of said proxy, a second HTTP request that originates from said target, said second HTTP request comprising said second domain and said requested resource;

sending, on the part of said proxy, a third HTTP request toward said server, said third HTTP request comprising said first domain and said requested resource;

receiving, on the part of said proxy, a second HTTP response originating from said server and related to said third HTTP request, said second HTTP response comprising said requested resource;

modifying, on the part of said proxy, said requested resource;

sending, on the part of said proxy, a third HTTP response to said target, said third HTTP response comprising said modified resource.

2. The method according to claim 1, wherein said step of sending said first HTTP response, said step of sending said third HTTP response and said step of sending said DNS response comprise a step of inserting in said first HTTP response, in said third HTTP response and in said DNS response information contained in said first HTTP request, in said third HTTP request and in said DNS query, respectively.

3. The method according to claim 2, wherein said information contained in said first HTTP request and in said third HTTP request comprise SEQ and ACQ numbers of SYN/ACK packets of the TCP protocol associated with said first HTTP request and with said third HTTP request.

4. The method according to claim 1, wherein said second domain is a subdomain of said first domain.

5. The method according to claim 1, wherein said second domain is non-existent.

6. The method according to claim 1, wherein said step of modifying said requested resource and said step of sending said third HTTP response comprising said modified resource to said target occur simultaneously in streaming mode.

7. A device for manipulating the data traffic related to a target, said target being connected to a data communications network whose elements communicate by means of the HTTP protocol, comprising:

a redirection device, which is adapted to be connected to said data communications network by means of a plurality of sniffing interfaces and a packet sending interface;

a proxy, which is adapted to be connected to said data communications network by means of an HTTP connection interface, a packet receiving interface and a packet injection interface; wherein said redirection device is configured to monitor network traffic by means of said sniffing interfaces in order to identify within said network traffic at least one data packet associated with said target and to redirect, by means of said packet sending interface, said at least one data packet associated with said target toward said proxy; and wherein said proxy is configured to send, by means of said HTTP connection interface, an HTTP request toward elements of said data communications network, said HTTP request being based on the content of said data packet associated with said target, and to send, by means of said packet injection interface, data to said target, said data being based on the data received in response to said HTTP request;

wherein said device is further configured to passively intercept a first HTTP request that originates from said target, said first HTTP request comprising a first domain associated with a server and a requested resource;

send a first HTTP response related to said first HTTP request, said first HTTP response comprising redirection instructions, said redirection instructions in turn comprising a second domain;

passively intercept a DNS query toward a DNS server that originates from said target, said DNS query comprising a query to resolve said second domain with an IP address;

send a DNS response related to said DNS query, said DNS response comprising the resolution of said second domain with the IP address of said proxy;

receive a second HTTP request that originates from said target, said second HTTP request comprising said second domain and said requested resource;

send a third HTTP request toward said server, said third HTTP request comprising said first domain and said requested resource;

receive a second HTTP response originating from said server and related to said third HTTP request, said second HTTP response comprising said requested resource;

modify said requested resource;

send a third HTTP response to said target, said third HTTP response comprising said modified resource.

8. The device according to claim 7, wherein it is placed within said data communications network in the vicinity of an access switch associated with said target.

* * * * *